United States Patent [19]

Sasuta et al.

[11] Patent Number: 5,034,993
[45] Date of Patent: Jul. 23, 1991

[54] METHOD FOR ALLOCATING COMMUNICATION RESOURCES AMONG RF COMMUNICATIONS SYSTEMS

[75] Inventors: Michael D. Sasuta, Palatine; Arun Sobti, Wheaton, both of Ill.

[73] Assignee: Motorola, Inc., Schaumburg, Ill.

[21] Appl. No.: 324,168

[22] Filed: Mar. 15, 1989

[51] Int. Cl.$^5$ .............................. H04B 7/26
[52] U.S. Cl. ............................ 455/11; 455/54; 455/34; 379/63
[58] Field of Search ............ 455/88, 56, 11, 33, 455/34, 53, 54; 379/59, 63

[56] References Cited

U.S. PATENT DOCUMENTS

| | | | |
|---|---|---|---|
| Re. 32,789 | 11/1988 | Lynk Jr. et al. | 379/58 |
| 4,553,262 | 11/1985 | Coe | 455/15 |
| 4,554,677 | 11/1985 | Smith et al. | 455/54 |
| 4,573,207 | 2/1986 | Smith et al. | 455/54 |
| 4,670,905 | 6/1987 | Sandvos et al. | 455/33 |
| 4,696,052 | 9/1987 | Breeder | 455/56 |
| 4,726,014 | 2/1988 | Goldman et al. | 455/56 |
| 4,748,681 | 5/1988 | Schmidt | 455/56 |
| 4,794,635 | 12/1988 | Hess | 379/60 |
| 4,870,408 | 9/1989 | Zdunek | 455/34 X |

OTHER PUBLICATIONS

General Electric Public Service Trunking System Description-May 9, 1986 JSC.

Primary Examiner—Douglas W. Olms
Assistant Examiner—Ralph Smith
Attorney, Agent, or Firm—John W. Hayes

[57] ABSTRACT

A method for allocating RF communication resources among RF communication systems. This allocation may be base strictly upon demand or it may be based upon the loading of an RF communication system or the relative loading among a group of RF communication systems.

5 Claims, 1 Drawing Sheet

METHOD FOR ALLOCATING COMMUNICATION RESOURCES AMONG RF COMMUNICATIONS SYSTEMS

TECHNICAL FIELD

This invention relates generally to RF communication systems and in particular to a method for efficiently allocating the communication resources used by such systems.

BACKGROUND ART

RF communication systems are known. In general, RF communication systems contain one or more fixed units, one or more mobile units, and one or more portable units. The mobile and portable units may communicate with the fixed unit, or they may communicate among themselves. Such communication is in the form of information signals, which may be voice or data. In order for communication to take place, an RF communication system requires communication resources. These resources can be, for example, RF channels, pairs of RF channels (in the case of full duplex communication), or time slots in time division multiplexed (TDM) systems.

Allocation of such communication resources is often inefficient. Such allocation is frequently based on guesses concerning how heavily used or loaded the RF communication system will be, and once the assignment of communication resources has been made, such assignment is permanent in nature. Accordingly, a need arises for an efficient, automatic technique for temporarily allocating RF communication resources among RF communication systems.

SUMMARY OF THE INVENTION

According to the invention, a first group of communication resources is permanently allocated or assigned to an RF communication system. A similar fixed group of resources is permanently assigned to a second system. A third group of RF communication resources is then provided, and the elements of this third group of resources are dynamically or automatically allocated to one or more of the RF communication systems. This allocation of resources is temporary and can be made based on various factors.

One scheme for allocating communication resources is based on demand. RF communication resources can be allocated to whichever system is most heavily loaded. This system of RF resource allocation presumes that a system which is most heavily loaded will have the highest future demand for RF communication resources.

Another technique fo prioritizing the allocation of RF communication resources is to compare the demands of RF communication systems, and allocate RF communication resources to the systems in a ratio that is proportional to the relative demand of the systems being compared. In yet another technique, allocation of RF communication resources from the third group would depend upon a request being received from one of the RF communication systems. For example, since each system has a group of RF communication resources permanently allocated to it, there may come a time when all these permanently allocated resources are in use. When this occurs, the RF communication system could simply request the allocation of an additional resource. The remaining resources in the third group of RF communication resources would be held in reserve until further requests for new resource allocations are received.

In the alternative, no permanently assigned resources need be associated with any of the RF communication systems. Allocation of resources can take place from a large reserve pool of available resources in a totally dynamic fashion.

DETAILED DESCRIPTION OF THE INVENTION

Figure 1:
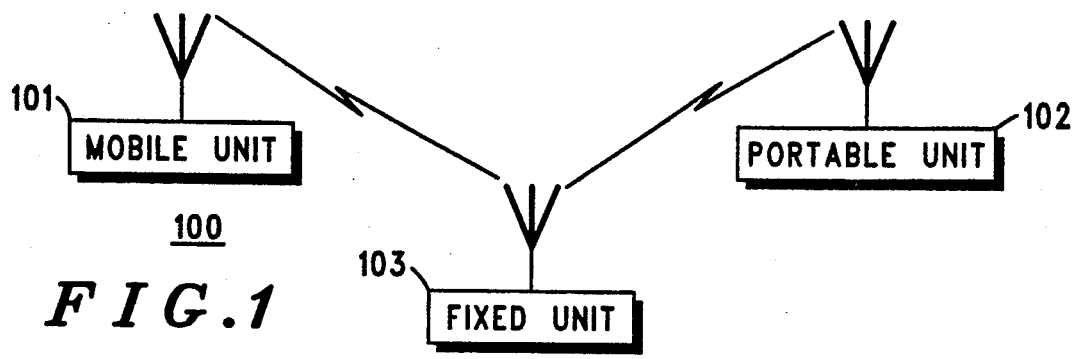
FIG. 1 is a block diagram of an RF communication system.

Referring now to FIG. 1, an RF communication system (100) can be seen. The RF communication system (100) includes a fixed unit (103), mobile unit (101), and portable unit (102). A typical RF communication system (100) may, of course, contain more than one fixed unit (103) and a plurality of mobile units (101) and portable units (102); the representative numbers have been minimized here for purposes of clarity. The mobile and portable units may communicate with the fixed units, or they may communicate among themselves. In order for this communication to take place efficiently, the communication system requires communication resources such as RF communication channels, pairs of RF channels, or TDM slots.

Figure 2:
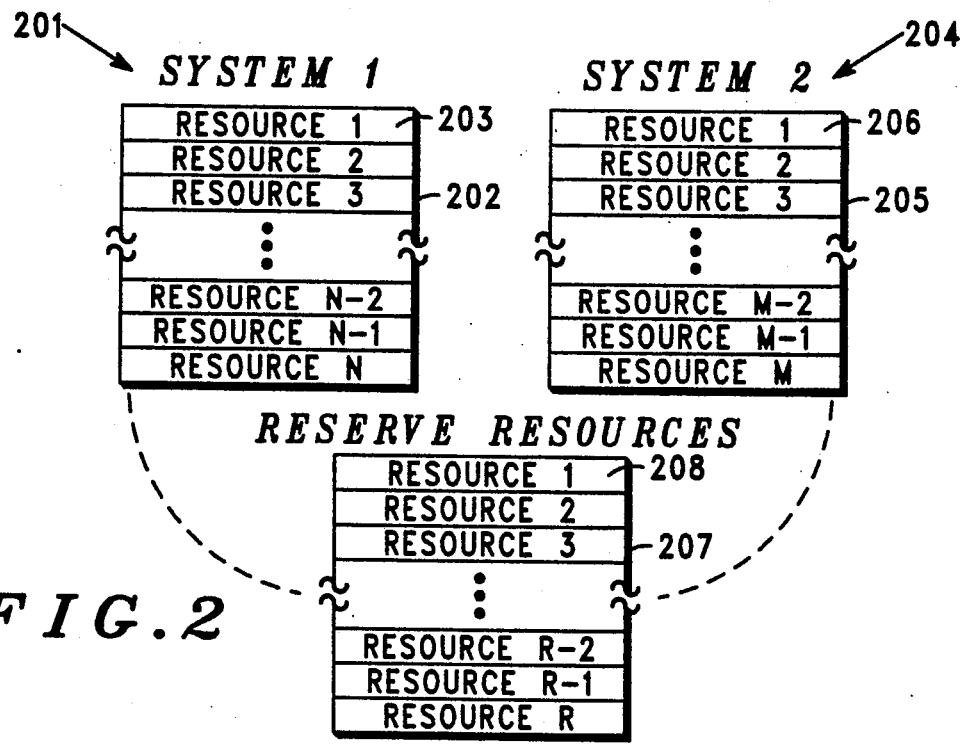
FIG. 2 is a representation of two typical RF communication systems and a representation of a third group of RF communication resources which are held in reserve.

Turning now to FIG. 2, a representative of the RF communication resources available can be seen. First, RF communication System 1 (201) has associated with it a group (202) of communication resources (203). There are N communication resources associated with System 1. These resources are permanently assigned to System 1. FIG. 2 also shows a second RF communication system, System 2 (204). System 2 also has a permanently assigned group (205) of communication resources (206). There are M of these communication resources (206) numbered 1-M.

FIG. 2 also shows a representation of a third group (207) of communication resources (208). This third group of resources is the group from which automatic temporary allocation of resources is made.

The third group (207) of RF communication resources (208) contains R resources numbered 1-R. In one embodiment, all R resources (208) would be allocated to the system (201 or 204) that is most heavily loaded. For example, if System 1 (201) were being heavily used to the extent that almost all N of the permanently allocated resources (203) were being used, while System 2 (204) were being lightly used, to the extent that only a relatively small number of its M available resources (206) were being employed, all R of the resources (208) available for allocation would be assigned temporarily to System 1 (201), in anticipation of continued heavy loading.

Other schemes for efficient, dynamic allocation are also contemplated within the scope of the invention. If neither System 1 (201) nor System 2 (204) were loaded to the point where nearly all of the permanently allocated resources were in use, the number of resources in use in System 1 (201) would be compared to the number of resources in use in System 2 (204), and dynamic, temporary allocation of additional resources would be made on that basis. For example, if System 1 (201) had twice as many resources in use as System 2 (204), then 2R/3 resources from the reserve group (207) would be temporarily dynamically allocated to System 1 (201), while R/3 resources would be allocated to System 2 (204).

Yet another scheme would hold all R of the resources (208) in reserve unless a specific request for additional resources were received from a communication system in need. If System 1 (201) were fully loaded such that all N of the permanently allocated resources (203) were in use, and yet had need of more resources to permit additional communication, System 1 (201) would request the allocation of an additional resource, and one of the R available resources (208) from the reserve group (207) would then be assigned to System 1 (201).

In yet another embodiment, no communication resources need be permanently allocated to System 1 (201) or System 2 (204). A relatively large group (207) of communication resources (208) may be made available, from which temporary automatic allocation to communication systems may be made.

Figure 3:
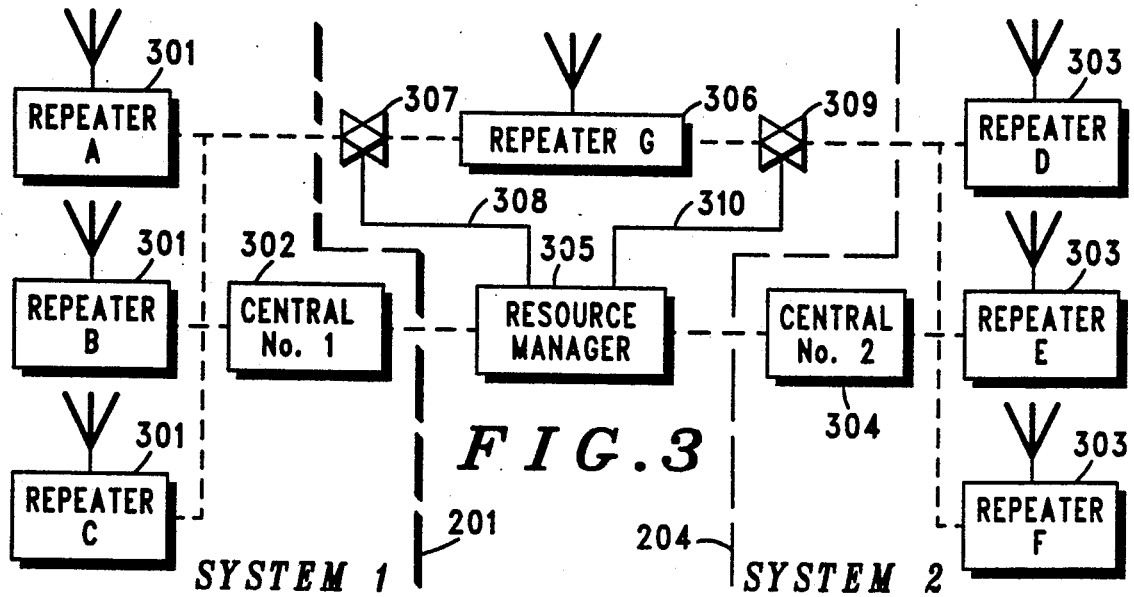
FIG. 3 is a more detailed representation of two typical RF communication systems, each having repeater units and a central controller, with a resource manager being utilized for resource allocation.

FIG. 3 illustrates how communication resource management may be effected among two or more communication systems (201 and 204). Each communication system may contain mobile units and portable units, as discussed with reference to FIG. 1 above. One or more of the fixed units may be repeater units (301 and 303). A repeater unit is a transmitter/receiver that receives an information signal on one frequency and re-transmits the same information signal on another. Usually, the repeater unit receives on the same frequency that the mobile and portable units use for transmitting, and transmits on the same frequency that the mobile and portable units use for receiving. This use of repeater units greatly extends the range of the mobile and portable units, as is well known in the art.

In System 1 (201), each repeater unit (301) has the capability of using one of the communication resources (203 in FIG. 2) permanently assigned to System 1 (201). For maximum flexibility, each repeater unit (301, 303, or 306) may be programmable to utilize any of the available communication resources. In general, there will be as many repeater units (301 and 302) among the communication systems as there are communication resources which may be allocated (N+M+R). However, depending upon the range of the repeater units used, and the relative proximity of the communication systems involved, it may be necessary to provide N+M+2R repeater units in order to ensure that the available resources may be allocated to whichever communication system requires them. A central controller (302) monitors use of communication resources and communicates this usage or loading information to a resource manager (305). The resource manager (305) then allocates or de-allocates resources based upon this loading information provided by the central controllers (302 and 303).

For example, if System 1 were loaded to the point that the repeater stations (301) corresponding to the permanently allocated channels for System 1 were all in use, the central controller (302) would communicate this information to the resource manager (305). The resource manager (305) would then select an unused repeater (306), representing a communication resource from the reserve pool (207 in FIG. 2), program it, if necessary, to utilize the proper communication resource, and make this resource available to System 1 (201). By placing one switch (307) in the ON state via its appropriate control line (308), and placing the other switch (309) in the OFF state via its control line (310), the resource manager (305) allows central controller 1 (302) to control repeater G (306). Thus, repeater G (306) and its corresponding communication resource are temporarily automatically assigned by the resource manager (305) to System 1 (201).

What is claimed is:

1. A method for allocating communication resources among at least first and second RF communication systems, wherein each of the first and second RF communication systems comprises:
   at least one repeater unit; and
   a plurality of mobile and/or portable units;
   the method comprising the steps of:
   (a) providing a first group of communication resources to the first RF communication system;
   (b) providing a second group of communication resources to the second RF communication system; and
   providing a third group of communication resources,
   wherein communication resources belonging to said third group are automatically temporarily allocated to at least the first and second RF communication systems.

2. The method in accordance with claim 1, wherein all of the communication resources belonging to said third group of communication resources are automatically temporarily allocated to the RF communication system that is most heavily loaded.

3. The method in accordance with claim 1, wherein portions of the communication resources belonging to said third group of communication resources are automatically temporarily allocated to each of said RF communication systems, the relative sizes of said portions being dependent upon the relative loading of each of said RF communication systems.

4. The method in accordance with claim 1, wherein at least one of the communication resources belonging to said group of communication resources is automatically temporarily allocated to one of said RF communication systems when a request for allocation is transmitted by one of said RF communication systems.

5. An apparatus for allocating communication resources among at least first and second RF communication systems, wherein each of the first and second RF communication systems comprises:
   at least one repeater unit; and
   a plurality of mobile and/or portable units;
   the apparatus comprising:
   means for providing a first group of communication resources to the first RF communication system;
   means for providing a second group of communication resources to the second RF communication system;
   means for providing a third group of communication resources, wherein communication resources belonging to said third group are automatically temporarily allocated to at least the first and second RF communication systems.

* * * * *

UNITED STATES PATENT AND TRADEMARK OFFICE
CERTIFICATE OF CORRECTION

PATENT NO. : 5,034,993

DATED : July 23, 1991

INVENTOR(S) : Michael D. Sasuta et al

It is certified that error appears in the above-identified patent and that said Letters Patent is hereby corrected as shown below:

Col. 4, line 46, between the words "said" and "group" insert --third--.

Signed and Sealed this

Second Day of March, 1993

*Attest:*

STEPHEN G. KUNIN

*Attesting Officer*     Acting Commissioner of Patents and Trademarks